(12) United States Patent
Cho

(10) Patent No.: US 8,398,863 B2
(45) Date of Patent: Mar. 19, 2013

(54) WATER-PURIFYING APPARATUS GENERATING ANIONS AND PROCESSING METHOD THEREOF

(76) Inventor: Chun Haeng Cho, Seoul (KR)

( * ) Notice: Subject to any disclaimer, the term of this patent is extended or adjusted under 35 U.S.C. 154(b) by 317 days.

(21) Appl. No.: 12/673,938

(22) PCT Filed: Aug. 22, 2008

(86) PCT No.: PCT/KR2008/004905
§ 371 (c)(1),
(2), (4) Date: Feb. 23, 2010

(87) PCT Pub. No.: WO2009/025520
PCT Pub. Date: Feb. 26, 2009

(65) Prior Publication Data
US 2010/0213138 A1 Aug. 26, 2010

(30) Foreign Application Priority Data

Aug. 23, 2007 (KR) .......................... 10-2007-0085019
Mar. 20, 2008 (KR) .......................... 10-2008-0025770

(51) Int. Cl.
*C02F 1/72* (2006.01)
*B01J 19/18* (2006.01)
*B01F 7/00* (2006.01)

(52) U.S. Cl. ........ 210/758; 210/764; 210/192; 210/205; 210/262; 422/225; 422/228; 366/280; 366/290; 366/300

(58) Field of Classification Search ............... 210/752, 210/758, 764, 151, 192, 199, 201, 203, 205, 210/219, 222, 252, 255, 262; 422/225, 228; 366/280, 290, 291, 297, 300
See application file for complete search history.

(56) References Cited

U.S. PATENT DOCUMENTS

| | | | | |
|---|---|---|---|---|
| 1,156,409 A | * | 10/1915 | Klein | 366/291 |
| 6,280,615 B1 | * | 8/2001 | Phillips et al. | 210/205 |
| 7,981,378 B2 | * | 7/2011 | Tamura | 210/205 |

FOREIGN PATENT DOCUMENTS

| | | |
|---|---|---|
| JP | 2001079557 A | 3/2001 |
| WO | 2004/033379 A1 | 4/2004 |
| WO | 2005/079635 A1 | 9/2005 |

* cited by examiner

*Primary Examiner* — Lucas Stelling
(74) *Attorney, Agent, or Firm* — Novak Druce Connolly Bove + Quigg LLP

(57) ABSTRACT

Water-purifying apparatus which generates anions and processing method thereof, which activates water through generating anions to obtain good quality purified water corresponding to pure life-giving water. Raw water introduced into the water-purifying apparatus is introduced into an inflow pipe formed in a zigzag shape and rotating units are rotated by flow rate of the introduced raw water, to raise a vortex phenomenon to generate bubbles. Accordingly, anion content and dissolved oxygen amount increases. Moreover, filter members filter poisonous impurities in the raw water to provide good quality purified water. Generation of bubbles and anions activates water to obtain good quality purified water healthy and appropriate for humans, and provide effects such as promoting environment improvement of water quality purification in the water quality purification field, promoting health improvement of treating and preventing diseases in the medical field, and promoting growth of animals and plants in the life science field.

14 Claims, 5 Drawing Sheets

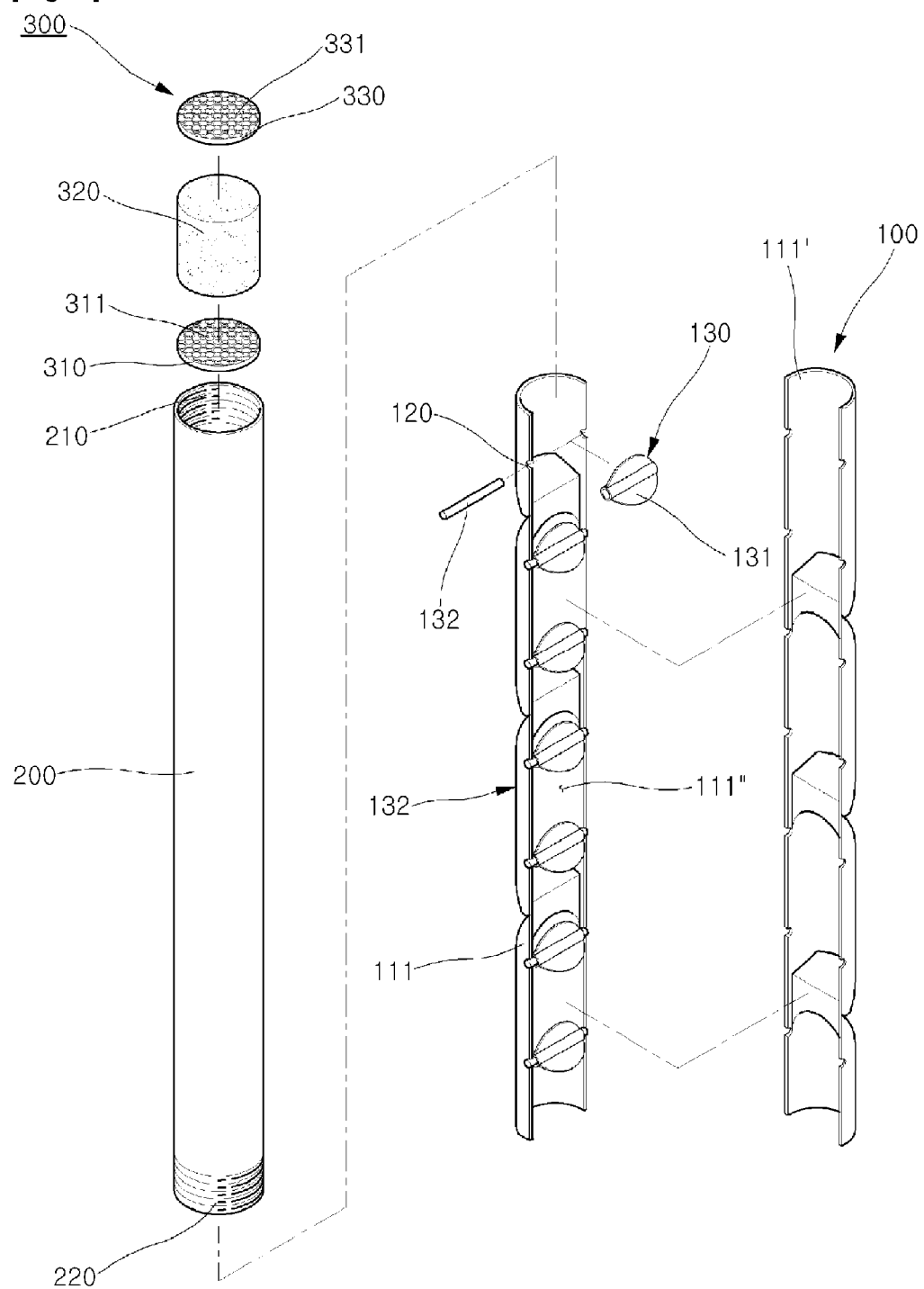

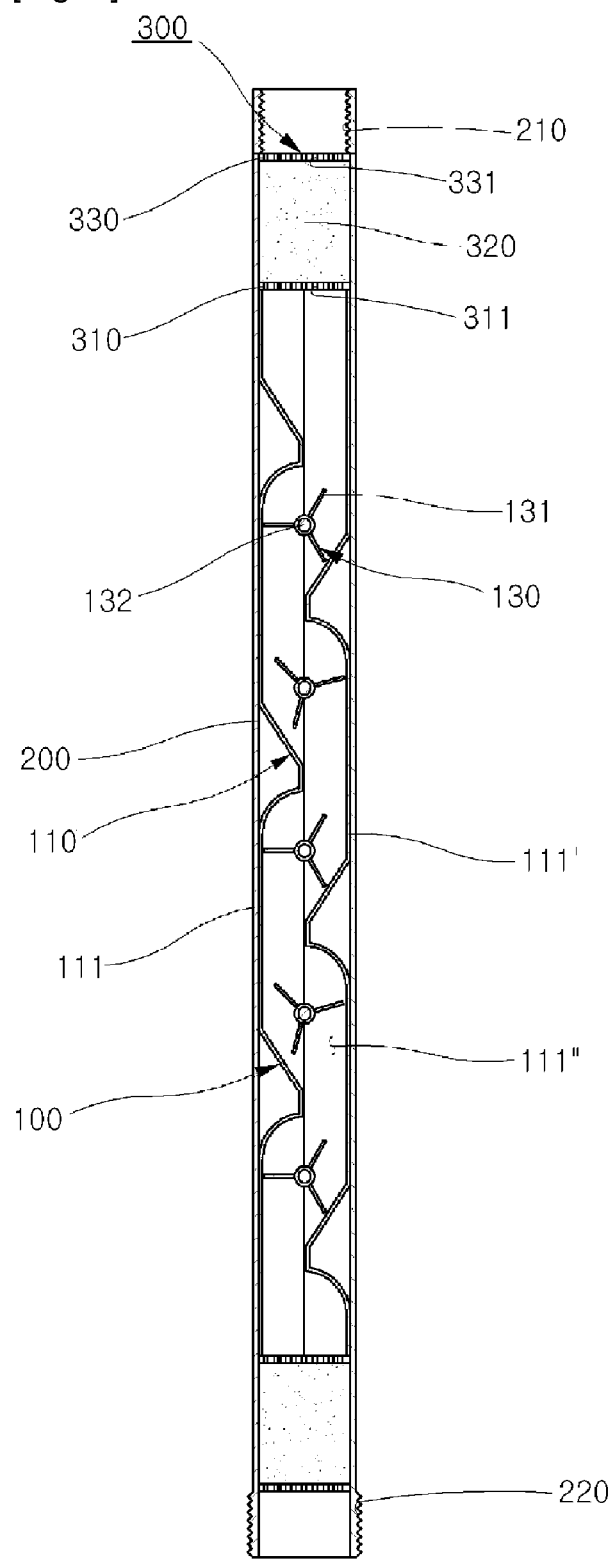
[Fig. 2]

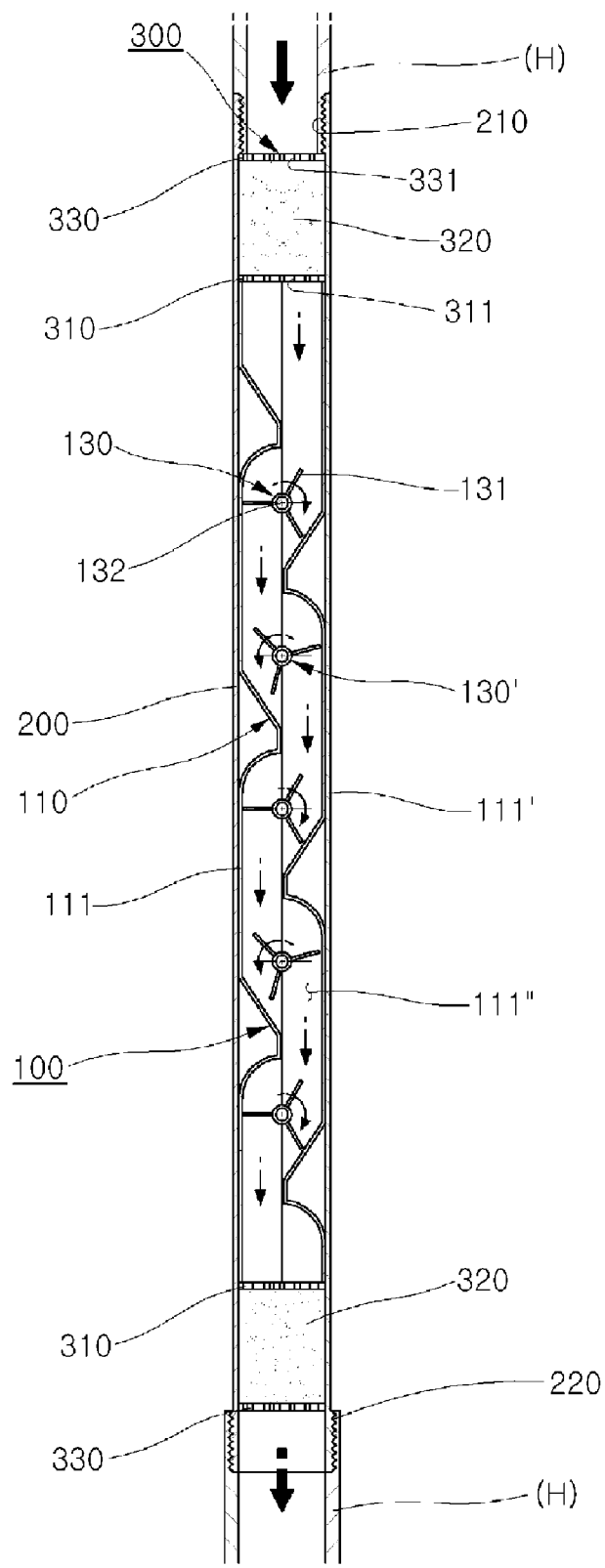
[Fig. 3]

[Fig. 4]
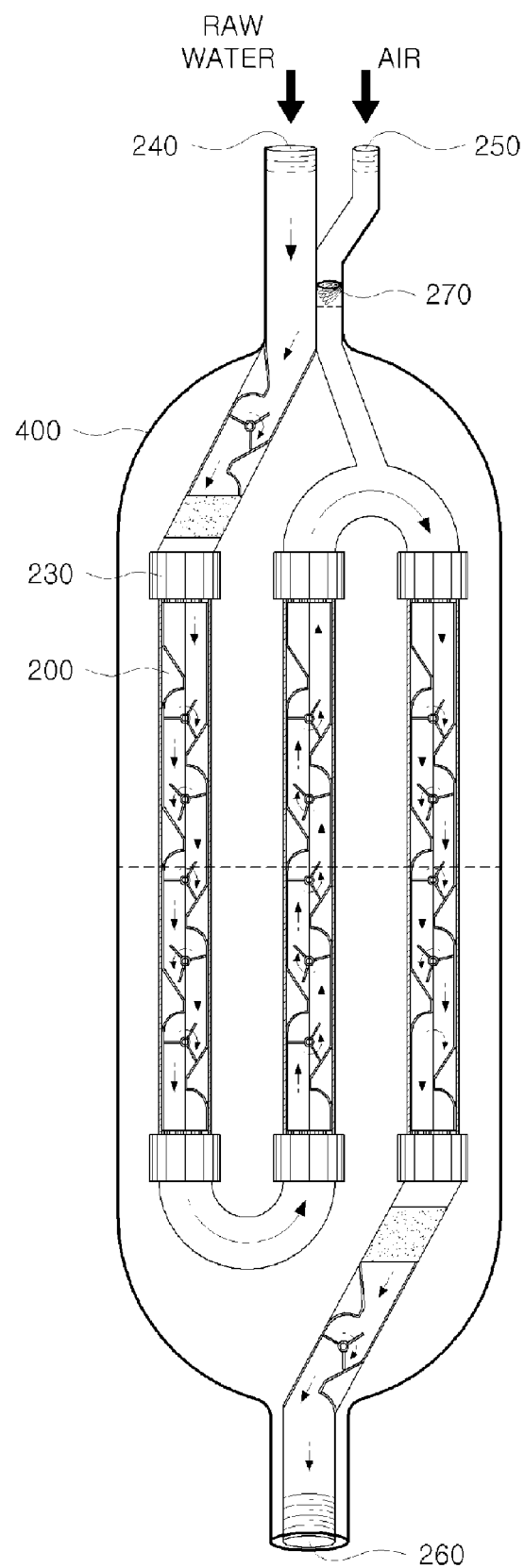

[Fig. 5]
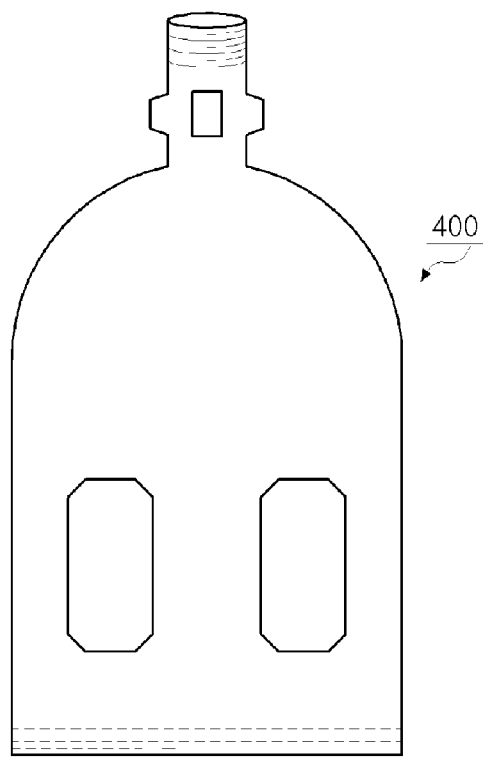
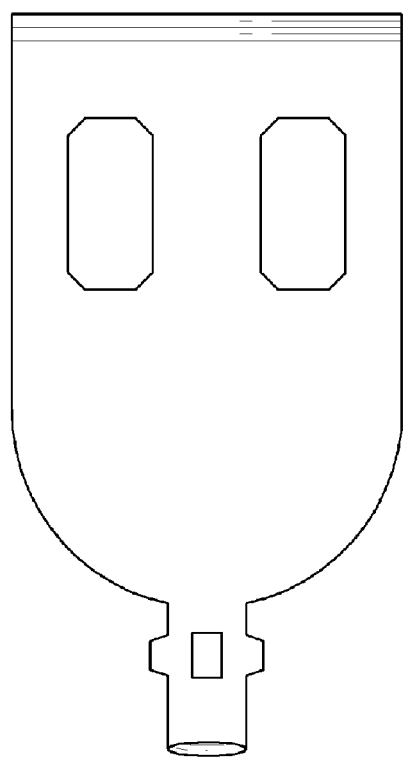

WATER-PURIFYING APPARATUS GENERATING ANIONS AND PROCESSING METHOD THEREOF

CROSS-REFERENCE TO RELATED APPLICATIONS

This application is a §371 National Stage Application of International Application No. PCT/KR2008/004905, filed on 22 Aug. 2008, claiming the priority of Korean Patent Application No. 10-2007-0085019 filed on 23 Aug. 2007 and Korean Patent Application No. 10-2008-0025770 filed on 20 Mar. 2008.

TECHNICAL FIELD

The present invention relates to a water-purifying apparatus which generates anions and processing method thereof. More particularly, the present invention relates to a water-purifying apparatus which generates anions and processing method thereof, in which rotating units rotate by flow rate of raw water, to thus break structure of water molecules and generate anions as well as bubbles, and to thereby provide a good quality of purified water which is proper for the human body, and assist improvement of water quality and promotion of health.

BACKGROUND ART

Water is a chemical compound of oxygen and hydrogen. Pure water is colorless, odor-free, tasteless and transparent. In the natural systems, water is ordinarily distributed in the form of rivers, lakes, seas, subsurface water, etc, under the normal temperature. Water which is not purified is ordinarily polluted by undesirable bacillus and alien substances. Thus, non-purified water would be used as low-class water such as subsurface water, rather than drinking water.

Meanwhile, active water which is physiologically good for the human body is alkali water whose PH is 7.4 and in which minerals including inorganic matter of calcium, phosphate, etc., are rich. The molecule cluster of the active water is minutely formed. It means that the kinetic velocity of water molecules is big that the cluster of the water molecules is minute. In the case that the minute cluster of the water molecules is applied to growth of plants, germination and growth of plants are remarkably influenced. In other words, since the cluster of the water molecules is microscopic and the exercise of the water molecules is active, water absorption is quickly attained. In addition, if a white rat whose ovary is removed is made to steadily drink active water for three months, it was confirmed that an increase in a bone destruction factor called pryidinoline (PYD) which is used as a bone resorption index in osteoporosis is reportedly suppressed.

Likewise, a conventional water-purifying apparatus that fractionizes the cluster of the water molecules to thus create vital water is excellent in view of a water purifying capability, but has a problem that alkalinity minerals beneficial for the human body are mostly removed. In addition, since floating deposits, metallic salts or poisonous toxicants are contained in the water, the conventional water-purifying apparatus may provide water which are not proper as drinking water.

Meanwhile, it was known that elvans or permanent magnets may be inserted into the inside of filters of the conventional water-purifying apparatus in order to improve a purifying performance thereof, or the conventional water-purifying apparatus may be miniaturized to make be connected with a water feed pipe in a sink, to thereby purify raw water more cleanly. However, these are also limited to obtain a good filtering function.

DISCLOSURE OF INVENTION

Technical Problem

Therefore, to solve the above problems, it is an object of the present invention to provide a water-purifying apparatus which generates anions and processing method thereof, in which rotating units rotate by a stream of introduced raw water, to thereby raise a vortex phenomenon and to thus break structure of water molecules of the raw water and generate bubbles and increase the contents of anions, and poisonous impurities are filtered through filter members, to thereby provide a good quality of purified water which is more proper for the human body.

Technical Solution

To accomplish the above object of the present invention, there is provided a water-purifying apparatus which generates anions, the water-purifying apparatus comprising:

an anion generator having an inflow pipe formed in a zigzag form, so that raw water which is supplied from a water tap is introduced, and a number of rotating units which are rotated in respectively different directions in which coupling pins are fitted into the inside of the inflow pipe and rotating fins are radially formed on the outer side of the respective rotating units, to thereby make the rotating units rotate by flow rate of raw water which is introduced to thus generate bubbles and increase an amount of dissolved oxygen and simultaneously produce anions;

a support pipe whose inner portion is empty to accommodate the anion generator in which water feed pipes are connected with both ends of the support pipe, respectively; and filter portions which prevent the anion generator from moving and which are respectively provided at both ends of the support pipe to filter the raw water.

There is also provided a water-purifying apparatus which generates anions to activate water to thereby obtain a good quality of purified water, the water-purifying apparatus comprising:

a case having a given height and inner space volume;

an anion generator having an inflow pipe formed in a zigzag form, so that supplied raw water is introduced, and a number of rotating units which are rotated in respectively different directions by flaw rate of raw water which is introduced into the inflow pipe, to thereby make the rotating units rotate by the introduced raw water to thus raise a vortex phenomenon and generate bubbles and increase an amount of dissolved oxygen and simultaneously increase content of anions;

a support pipe whose inner portion is empty to accommodate the anion generator and which is installed up and down in a zigzag form in the inside of the case in order to extend length of a water flow path;

filter portions which are respectively provided at both ends of the support pipe to filter poisonous impurities contained the raw water; and a number of inlet portions through which raw water is supplied and air is inhaled and an outlet portion which discharges the filtered purified water, which are withdrawn to the outside of the case.

There is still also provided a water-purifying processing method which purifies raw water by generation of anion generators, the water-purifying processing method comprising the steps of:

(a) filtering the introduced raw water to filter impurities;

(b) making the filtered raw water flow along a flowing path of an inflow pipe and making a number of rotating units which are installed in the inflow pipe rotate in respectively different directions by velocity of the purified water, to thus decompose structure of water molecules to raise a nano-phenomenon and to change the structure of water molecules, and to thereby generate bubbles and anions;

(c) making the purified water into which the bubbles and anion have been generated move in a zigzag form up and dawn in the inflow pipe, and make a friction with the wall of the inflow pipe, to thereby cause a chemical reaction between oxygen and floating matters to thus sterilize the purified water; and (d) filtering the purified water containing the generated anions in which only good microorganisms remain through the sterilization, to thus filter the remainder impurities and then discharge the purified water.

Advantageous Effects

As described above, a water-purifying apparatus which generates anions and processing method thereof, decomposes structure of water molecules by a vortex phenomenon which occurs when rotating units rotate by flow rate of raw water, to thus increase an amount of dissolved oxygen and content of anions in the inside of the inflow pipe together with microscopic bubbles. Here, impurities may cause a chemical reaction and may be oxidized in the air. Accordingly, harmful bacillus cannot exist in the purified water. Therefore, the water-purifying apparatus according to the present invention provides a water purification function and changes raw water into energy water which is the most beneficial to the human body, to thus provide an effect of promoting health of the human body. Further, harmful impurities contained in raw water are filtered through a filter member, to thus prevent foreign matters from being formed in the inside of the inflow pipe and an outlet pipe, as well as to provide a good quality of purified water. As a result, the water-purifying apparatus according to the present invention may be easily maintained and repaired, to thus provide an economical effect.

BRIEF DESCRIPTION OF THE DRAWINGS

The above and/or other objects and/or advantages of the present invention will become more apparent by describing the preferred embodiments thereof in detail with reference to the accompanying drawings in which:

FIG. 1 is a perspective view showing a water-purifying apparatus which generates anions according to the present invention;

FIG. 2 is a cross-sectional view of the apparatus of FIG. 1;

FIG. 3 is a cross-sectional view showing a state of use of an exemplary embodiment of the FIG. 1 apparatus;

FIG. 4 is a cross-sectional view showing a state of use of another exemplary embodiment of the FIG. 1 apparatus; and FIG. 5 illustrates an external appearance of a case shown in FIG. 4.

BEST MODE FOR CARRYING OUT THE INVENTION

The present invention provides a water-purifying apparatus which generates anions. The water-purifying apparatus comprises: an anion generator having an inflow pipe formed in a zigzag form, so that raw water which is supplied from a water tap is introduced, and a number of rotating units which are rotated in respectively different directions in which coupling pins are fitted into the inside of the inflow pipe and rotating fins are radially formed on the outer side of the respective rotating units, to thereby make the rotating units rotate by flow rate of raw water which is introduced to thus generate bubbles and increase an amount of dissolved oxygen and simultaneously produce anions; a support pipe whose inner portion is empty to accommodate the anion generator in which water feed pipes are connected with both ends of the support pipe, respectively; and filter portions which prevent the anion generator from moving and which are respectively provided at both ends of the support pipe to filter the raw water.

The present invention also provides a water-purifying apparatus which generates anions to activate water to thereby obtain a good quality of purified water. The water-purifying apparatus comprises: a case having a given height and inner space volume; an anion generator having an inflow pipe formed in a zigzag form, so that supplied raw water is introduced, and a number of rotating units which are rotated in respectively different directions by flow rate of raw water which is introduced into the inflow pipe, to thereby make the rotating units rotate by the introduced raw water to thus raise a vortex phenomenon and generate bubbles and increase an amount of dissolved oxygen and simultaneously increase content of anions; a support pipe whose inner portion is empty to accommodate the anion generator and which is installed up and dawn in a zigzag form in the inside of the case in order to extend length of a water flow path; filter portions which are respectively provided at both ends of the support pipe to filter poisonous impurities contained the raw water; and a number of inlet portions through which raw water is supplied and air is inhaled and an outlet portion which discharges the filtered purified water, which are withdrawn to the outside of the case.

The present invention still also provides a water-purifying processing method which purifies raw water by generation of anion generators. The water-purifying processing method comprises the steps of: (a) filtering the introduced raw water to filter impurities; (b) making the filtered raw water flow along a flowing path of an inflow pipe and making a number of rotating units which are installed in the inflow pipe rotate in respectively different directions by velocity of the purified water, to thus decompose structure of water molecules to raise a nano-phenomenon and to change the structure of water molecules, and to thereby generate bubbles and anions; (c) making the purified water into which the bubbles and anion have been generated move in a zigzag form up and down in the inflow pipe, and make a friction with the will of the inflow pipe, to thereby cause a chemical reaction between oxygen and floating matters to thus sterilize the purified water; and (d) filtering the purified water containing the generated anions in which only good microorganisms remain through the sterilization, to thus filter the remainder impurities and then discharge the purified water.

MODE FOR THE INVENTION

Hereinbelow, a water-purifying apparatus which generates anions and processing method thereof according to a preferred embodiment of the present invention will be described with reference to the accompanying drawings. Like reference numerals denote like elements through the following embodiments.

The water-purifying apparatus according to the present invention may be implemented to cause a vortex exercise necessary for a natural stream of water in the inside of a pipe and to make water particles slide smoothly along the wall of the pipe, based on a principle that water flows naturally in the clear nature.

FIG. 1 is a perspective view showing a water-purifying apparatus which generates anions according to the present invention. The water-purifying apparatus shown in FIG. 1 includes: an anion generator 100 which generates anions; a support pipe 200 whose inner portion is empty to accommodate the anion generator 100 in which water feed pipes (H) are connected with both ends of the support pipe, respectively; and filter portions 300 which prevent the anion generator 100 from moving and which are respectively provided at both ends of the support pipe 200 to filter the raw water. Here, the support pipe 200 is made of a metal pipe of copper, zinc etc. A female screw 210 and a male screw 220 are formed at both ends of the support pipe 200. Accordingly, support pipe 200 is screw-connected with other support pipe or a raw water feed pipe (H) in order to extend a water flow path.

The anion generator 100 includes an inflow pipe 110 formed in a zigzag form, so that raw water which is supplied from a water tap is introduced, and a number of rotating units 130 which are rotated by velocity of the raw water introduced into the inflow pipe 110. Here, the inflow pipe 110 is cylindrical, but the form and quality of the material of the inflow pipe 110 may be selected variously. The inflow pipe 110 includes a first body 111 which is concave at predetermined intervals so that raw water can be introduced in which a water flowing path 111" is formed, and a second body 111' which is formed to have a water flowing path of a zigzag shape in opposition to the first body 111. Coupling holes 120 are provided at both sides of the first and second bodies 111 and 111' at predetermined intervals. Each of the rotating units 130 is fitted with and coupled with the coupling pin 132 through the coupling hole 120. Rotating fins 131 are formed on the outer side of the respective rotating units 130. The rotating units 130 are made to rotate in the respectively different directions.

The filter portion 300 includes a first fixing plate 310 through the upper and lower portions of which throughholes 311 are formed, in order to prevent the anion generator 100 from moving, a filter member 320 which is located on the first fixing plate 310 to filter the raw water, and a second fixing plate 320 through the upper and lower portions of which throughholes 331 are formed, in order to prevent the filter member 320 from moving.

The coupling process of the water-purifying apparatus which is constructed as described above will follow.

As illustrated in FIG. 2, the first body 111 is firstly put on a floor. At this state, rotating units 130 on which rotating pieces 131 are formed are located at the positions of coupling holes 120 formed on both sides of the first body 111, and then the rotating units 130 are fitted with respective coupling pins 132 through the coupling holes 120.

In the same manner as the above-described process, a number of rotating units 130 are combined with the respective coupling pins 132 through the coupling holes 120. That is, the rotating units 130 are combined with the coupling holes 120.

In addition, at the state where the rotating units 130 are combined with the coupling holes 120, the second body 111' is closely attached on the upper portion of the first body 111. Here, the second body 111' is located to form a water flowing path 111" in a zigzag form with respect to the first body 111.

The first body 111 and the second body 111' that have been attached as described above are compregnated by a welding process, to thus form an anion generator 100.

Here, in the case of the anion generator 100, an inflow pipe 110 may be made of a ferrite magnet, or respective rotating units 130 including the inflow pipe 110 may be made of a ferrite magnet.

At the state where the inflow pipe 110 is fitted into the inside of the support pipe 200, the first fixing plate 310 on which throughholes 311 are formed is fitted at both sides of the inflow pipe 110, to thereby prevent the inflow pipe 110 from moving.

In addition, the filter member 320 which filters raw water is mounted on the first fixing plate 310, and then the second fixing plate 330 is combined with the filter member 320 so as to prevent the filter member 320 from seceding.

Feed pipes (H) of FIG. 3 are respectively combined with both side ends of the support pipe 200 combined with the filter portion 300 as described above.

Here, the feed pipes (H) may be respectively combined with both sides of the support pipe 200, in an interference fit mode, or the feed pipes (H) may be screw-connected with both side ends of the support pipe 200 in which female and male screws 210 and 220 may be formed at both side ends of the support pipe 200, respectively.

On the following, the water-purifying apparatus which generates anions according to the exemplary embodiment of the present invention and a state of using the same will be described with reference to FIGS. 3 to 5.

First, as an example of a state of use, as illustrated in FIG. 3, raw water which is supplied from a water tap is introduced along a feed pipe (H) and introduced raw water is introduced into the filter member 320 through the throughholes 331 of the second fixing plate 330. Accordingly, impurities contained in the introduced raw water are filtered.

The above-described purified water is introduced into the inside of the anion generator 100, through the first fixing plate 310, with a certain velocity of flay, and the introduced purified water moves to the rotating units 130 along the water flowing path of the inflow pipe 110.

The rotating units 130 are made to rotate forward around the coupling pins 132 by flow rate of the purified water, respectively, and the purified water is collided with the rotating pieces 131 which have been radially formed to thus generate bubbles in the inside of the inflow pipe 110.

The purified water that are collided with the rotating pieces 131 to thus generate bubbles as described above moves to the layer-left side of the rotating units 130 along the water flowing path 111" of the inflow pipe 110 which is formed in a zigzag shape. For example, a rotating unit 130' which is formed at the lower side of the inflow pipe 110 is rotated in a direction which opposes to that of a rotating unit 130 which is formed at the upper side thereof, by flay rate of the purified water. The purified water flows to the right-hand side along the water flowing path 111", and moves to the other rotating unit 130 which is formed at the lower side of the inflow pipe 110. The purified water repeatedly moves to the other rotating units 130 which are formed at the lower side of the inflow pipe 110, to thus generate a massive number of bubbles and simultaneously increase content of the anions, in the inside of the inflow pipe 110.

The purified water into which anions have been produced in the above-described process is introduced into the filter member 320 formed in the lower end portion of the inflow pipe 110, and remaining impurities that are contained in the purified water are filtered again.

Here, if the purified water undergoes an anion generating process of the anion generator 100, structure of the water molecules of the purified water is decomposed by bubbles occurrence. Accordingly, temperature of the purified water having undergone an anion generating process of the anion generator 100 becomes lower than that of the purified water which has not undergone an anion generating process of the anion generator 100.

The above-described filtered purified water is discharged to the lower feed pipe (H) so as to be supplied to users.

Meanwhile, as another example of a state of use, as illustrated in FIG. 4, support pipes 200 respectively accommodating an anion generator 100 are formed in a zigzag fashion at a certain interval. The support pipes 200 are installed in a case 400 having a certain height and inner space volume. Here, the case 400 is made of a plastic material. As shown in FIG. 5, upper and lower portions of the case 400 may be separated, and female and male screws are formed on the separated surfaces, respectively, to thereby enable the upper and lower portions of the case 400 to be combined with each other. Inlet portions 240 and 250 may be formed at the upper portion of the case 400, and a discharge portion 260 may be formed at the lower portion of the case 400, and vice versa. Both sides of the support pipe 200 which is installed in the case 400 are connected with one inlet 240 and the discharge portion 260, respectively. A raw water feed pipe (H) is linked with one inlet 240, and the other inlet 250 is opened so that air is inhaled therein. Of course, an air generating pump (not shown) is connected with the air inlet portion 250, to supply air into the air inlet portion 250. The air inlet portion 250 is linked to communicate with a connection portion of the upper portions of adjacent support pipes 200. A valve 270 for prevention of backward flaw is formed in the inner space of the air inlet portion 250. That is, the valve 270 is automatically opened by pressure of air that is inhaled at the time of inhalation of air, and is closed when water flows backward. The support pipes 200 are respectively finished with girdles 230 for preventing water from leaking at the connection portions between the support pipes 200.

If the raw water supplied along the feed pipe (H) is introduced to the inlet 240, the rotating units 130 rotate by flow rate of the introduced raw water. As a result, the structure of the water molecules in the introduced raw water is decomposed and the introduced raw water passes through the rotating units 130. Then, the raw water having passed through the rotating units 130 is introduced to the filter member 320 through the throughholes 331 of the second fixing plate 330, and the impurities included in the raw water are filtered. The filtered purified water is introduced into the inside of the anion generator 100 accommodated in the support pipe 200 through the throughholes 311 of the first fixing plate 310, with a certain velocity of flow. The filtered purified water is introduced into the inside of the anion generator 100 moves to the rotating units 130 along the water flowing path 111" of the inflow pipe 110. The rotating units 130 are made to rotate forward around the respective coupling pins 132 by flow rate of the purified water, and the purified water is collided with the radially formed rotating pieces 131, to thus generate bubbles in the inflow pipe 110.

The rotating units 130 in which the rotating pieces 131 are respectively formed are respectively located at the coupling holes 120 formed at both sides of the first body 111 of the inflow pipe 110, and the respective coupling pins 132 are fitted into the rotating units 130 via the coupling holes 120, to thus couple the rotating units 130 with the coupling holes 120, respectively. If the first body 111 and the second body 111' are coupled with each other at the state where the rotating units 130 has been coupled with the coupling holes 120, water flowing paths 111" are formed in a zigzag fashion. In this manner, the purified water which is collided with the rotating units 130 to thus generate bubbles flows in a zigzag fashion along the water flawing paths 111" of the inflow pipe 110 which is formed in a zigzag fashion, as shown as an arrow mark in FIG. 4. Here, the purified water moves to the left side of the lower end of the rotating units 130, respectively, and the rotating unit 130 formed at the lower portion of the inflow pipe 110 rotate in a direction opposing to that of the rotating unit 130 formed at the upper portion of the inflow pipe 110 by flow rate of the purified water. Here, the purified water flows to the right-hand side along the water flowing paths 111" of the inflow pipe 110, and moves to the rotating unit 130 which is formed at the lower end of the inflow pipe 110. That is, the purified water repeatedly moves from one rotating unit 130 which is formed at the upper side of the inflow pipe 110 to another rotating unit 130 which is formed at the lower side of the inflow pipe 110, to thus generate a massive number of bubbles and simultaneously increase content of the anions, in the inside of the inflow pipe 110.

Then, the purified water into which the anions have been produced move from the lower end of the inflow pipe 110 to the upper end thereof, and from the upper end of the inflow pipe 110 to the lower end thereof, along the inflow pipe 110 which is installed in a zigzag form, to thereby maximize generation of the anions and assist activation of the purified water. Here, the purified water is mixed with air inhaled via the air inlet portion 250, and thus a of the purified water flows smoothly, to thereby increase oxygen dissolved in the water, that is, the underwater oxygen. The underwater oxygen is pushed out by a strong pressure due to the centripetal force exercise, and thus is pushed out from the center to the periphery, and is guided by a flow of an annular surface body shape to thus bring about a centrifugal force exercise. Here, the term "a flow of an annular surface body shape" means a phenomenon that the peripheral portion of a central core is rotated in response to a spiral exercise that occurs at the central core, accompanying positional movement. Like oxygen, various particles which float underwater are also discharged to the will surface of the inflow pipe 110, but the particles whose densities are high and whose masses are big among the floating matters are persistently pushed out far along the central axis of the water flow. Heat is generated by friction with the will surface of the inflow pipe 110 in the periphery of a column of water. Oxygen that is pushed out to the neighborhood changes to an offensive substance that has a strong chemical reactivity due to the centrifugal force and the frictional heat. Thus, oxygen is easily acted with various floating matters, to thus create oxide, and pathogenic microbes are acted with oxygen having a strong chemical reactivity, to then be destroyed. However, good microorganisms survive without nearly from offensive attack of oxygen because they prefer a high concentration of oxygen.

The purified water into which the anions have been produced by the above-described series of processes is introduced into the filter member 320 formed in the layer end portion of the inflow pipe 110, and the remaining impurities contained in the purified water are filtered again. Here, if the purified water passes through the anion generator 250, the structure of water molecules of the purified water is decomposed by generation of bubbles. Accordingly, the structure of water molecules is split to thereby raise a nano-phenomenon and to finally change the structure of water molecules. As a result, temperature of the purified water having undergone an anion generating process of the anion generator 100 becomes lower than that of the purified water which has not undergone an anion generating process of the anion generator 100.

The structure of water molecules of the above-described filtered purified water is further split by rotation of the rotating units 130 which are provided in the front end of the discharge portion 260, to then be discharged to the lower feed pipe (H) through the discharge portion 260, and to thus be supplied for users. The analysis result which is obtained by analyzing a quality of water of the discharged purified water is illustrated in the following Table. Here, the unit is mg/l.

Table 1

TABLE

| Items | Water quality criteria | Analysis results |
|---|---|---|
| PH (hydrogen ion concentration) | 5.8-8.5 | 6.96 |
| Benzene | 0.001 or below | undetected |
| Toluene | 0.001 or below | undetected |
| Ethyl benzene | 0.001 or below | undetected |
| Xylene | 0.5 or below | undetected |
| Fluorine | 1.5 or below | undetected |
| Chloride ion | 250 or below | 12.02 |
| Sulphate ion | 200 or below | 9.55 |
| Nitrate nitrogen | 10 or below | 7.54 |
| Tentative plan | 0.01 or below | undetected |
| Bromine | 0.3 or below | undetected |
| Lead | 0.05 or below | undetected |
| Zinc | 1.0 or below | 0.048 |
| Copper | 1.0 or below | 0.009 |
| Cadmium | 0.01 or below | undetected |

In the result of review of the analysis result in the above-illustrated Table, it can be seen that the purified water having passed through the anion generator according to the present invention is not only suitable for criteria of the water quality of the drinking water, but also is changed into weak alkaline water suitable for the human body.

In addition, in the clinical result of making people drink the purified water which is obtained by the water-purifying apparatus according to the present invention, anions raise an ionization ratio of mineral ingredients in the blood to thus make the blood proceed to change into alkaline feature, make the blood clean, and festinate recovery of fatigue. As well, permeability of cell membranes improves. As a result, entrance and exit of nutrients and waste products have become lively and thus cellular activation and metabolism have become brisk. In addition, as an amount of globulin that is an immunity ingredient included in the serum has been increased, a resisting power about infection symptoms has been heightened.

The water-purifying apparatus which generates anions having the above-described functions and the processing method thereof according to the present invention may be used in various forms.

As described above, the water-purifying apparatus and the processing method thereof according to the exemplary embodiments of the present invention have been described with reference to the accompanying drawings. Here, terms or words used in the detailed description of the invention and claims should not be limited as ordinary or lexical meanings, and should be analyzed as meanings and concepts coinciding with the technological thought of this invention.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, a water-purifying apparatus which generates anions having the above-described functions and the processing method thereof according to the present invention may be applied in a variety of medical care, environmental and life science fields such as an apparatus for improving health of the human body, an apparatus for improving quality of water in the sea or river, and an apparatus for enhancing a washing efficiency.

The invention claimed is:

1. A water-purifying apparatus for generating anions, the water-purifying apparatus comprising:
an anion generator having an inflow pipe formed in a zigzag form, for introducing raw water supplied from a water tap, and
a number of rotating units,
wherein the number of rotating units comprises a first rotating unit rotatable in a first direction, and a second rotating unit rotatable in a second direction that is different from the first direction,
wherein coupling pins are fitted into the inside of the inflow pipe,
wherein rotating fins are radially formed on the outer side of the respective rotating units,
wherein the rotating units are rotatable by a flow of the introduced raw water to generate bubbles and increase an amount of dissolved oxygen and simultaneously produce anions;
a support pipe whose inner portion is empty to accommodate the anion generator in which water pipes are connected with both ends of the support pipe, respectively; and
filter portions for preventing the anion generator from moving, said filter portions respectively provided at both ends of the support pipe to filter the raw water.

2. The water-purifying apparatus according to claim 1, wherein the inflow pipe of the anion generator comprises:
a first body and a second body, the first body opposed to the second body;
wherein the first body and the second body are concave at predetermined intervals so raw water introduced into the inflow pipe follows a flow path having a zigzag shape within the inflow pipe; and
coupling holes are provided at opposing sides of the first and second bodies at predetermined intervals.

3. The water-purifying apparatus according to claim 1, wherein the filter portion comprises:
a first fixing plate, having an upper portion and a lower portion, wherein throughholes are formed through the upper portion and the lower portion to prevent the anion generator from moving;
a filter member located on the first fixing plate to filter the raw water; and
a second fixing plate, having a second upper portion and a second lower portion, wherein throughholes are formed through the second upper portion and through the second lower portion to prevent the filter member from moving.

4. A water-purifying apparatus for generating anions to activate water to obtain purified water, the water-purifying apparatus comprising:
a case having a given height and inner space volume;
an anion generator having an inflow pipe formed in a zigzag form, for introducing supplied raw water, and a number of rotating units, wherein the number of rotating units comprises a first rotating unit rotatable in a first direction, and a second rotating unit rotatable in a second direction that is different from the first direction, wherein the number of rotating units are rotable by a flow the raw water introduced into the inflow pipe to raise a vortex phenomenon and generate bubbles and increase an amount of dissolved oxygen and simultaneously increase a content of anions in the raw water;

a support pipe whose inner portion is empty to accommodate the anion generator and which is installed up and down in a zigzag form within the case to extend a length of a water flow path therein;

filter portions respectively provided at both ends of the support pipe for filtering poisonous impurities contained in the raw water; and a number of inlet portions for supplying the raw water there through and inhaling air there through and an outlet portion for discharging filtered purified water.

5. The water-purifying apparatus according to claim 4, wherein female and male screw-type threadings are formed on separated surfaces of the case, respectively, for enabling an upper portion and a lower portion of the case to be separably combined with each other.

6. The water-purifying apparatus according to claim 4, wherein the inflow pipe of the anion generator comprises:

a first body concave and an opposing second body;

wherein the first body and the second body are concave at predetermined intervals so raw water introduced into the inflow pipe follows a flow path having a zigzag shape within the inflow pipe, coupling holes are provided at opposing sides of the first and second bodies at predetermined intervals; and coupling pins which couple the rotating units with the coupling holes, respectively.

7. The water-purifying apparatus according to claim 4, wherein the support pipe is finished with a girdle for preventing water from leaking at a connection portion.

8. The water-purifying apparatus according to claim 4, wherein a valve for prevention of backward flow is formed in an inner space of an air inlet portion of the case.

9. The water-purifying apparatus according to claim 4, wherein the rotating units split the structure of water molecules at an inlet portion and an outlet portion of the case.

10. A water-purifying processing method which purifies raw water by generation of anions, the water-purifying processing method comprising the steps of:

(a) filtering the introduced raw water to filter impurities and produce filtered raw water;

(b) making the filtered raw water flow along a flowing path of an inflow pipe and making a number of rotating units installed in the inflow pipe rotate in a plurality of directions by velocity of the raw filtered water, to thus decompose structure of water molecules to raise a nano-phenomenon and to change the structure of water molecules, and to generate bubbles and anions thereby producing purified water;

(c) making the purified water move in a zigzag form up and down in the inflow pipe, and cause friction with the wall of the inflow pipe, to cause a chemical reaction between oxygen and floating matters to thus sterilize the purified water; and (d) filtering the purified water, to thus filter the remainder impurities and then discharge the purified water.

11. The water-purifying processing method of claim 10, wherein the step (c) further comprises the step of inhaling air and mixing the inhaled air with the purified water, to assist movement of the purified water and to increase oxygen levels in the purified water.

12. The water-purifying processing apparatus of claim 1, wherein each of the rotating units is inside of the inflow pipe and coupled with a respective said coupling pin.

13. The water-purifying processing apparatus of claim 4, wherein each of the rotating units is inside of the inflow pipe and coupled with a respective coupling pin.

14. The water-purifying processing method of claim 10, wherein each of the rotating units is inside of the inflow pipe and coupled with a respective coupling pin.

* * * * *